United States Patent [19]

Rehrig

[11] Patent Number: 4,537,413
[45] Date of Patent: Aug. 27, 1985

[54] PLASTIC BASKET FOR USE WITH A CART HAVING FRONT AND REAR BASKETS

[76] Inventor: B. Houston Rehrig, 4539 Gorham St., Corona Del Mar, Calif. 92625

[21] Appl. No.: 492,631

[22] Filed: May 9, 1983

[51] Int. Cl.³ .............................................. B62B 3/00
[52] U.S. Cl. ..................... 280/33.99 B; 280/33.99 R; 280/33.99 H
[58] Field of Search ............... 280/33.99 B, 33.99 F, 280/33.99 H, 33.99 R, DIG. 4; 16/DIG. 13

[56] References Cited

U.S. PATENT DOCUMENTS

| | | | |
|---|---|---|---|
| 3,751,059 | 8/1973 | Dunder | 280/DIG. 4 |
| 3,787,063 | 1/1974 | Oliver | 280/33.99 B |
| 4,046,394 | 9/1977 | Thompson, Jr. | 280/DIG. 4 |
| 4,273,346 | 6/1981 | Rehrig | 280/33.99 F |

Primary Examiner—Joseph F. Peters, Jr.
Assistant Examiner—Everett G. Diederiks, Jr.
Attorney, Agent, or Firm—Banner, Birch, McKie & Beckett

[57] ABSTRACT

What is disclosed is a basket for use as the rear basket in an over-the-counter cart having a horizontal frame to which a front and a rear basket are attached. The basket comprises two opposed side panels, a rear panel and a bottom panel attached together along their contiguous edges. A seat back panel is pivotally attached to the side panels and a child's seat is pivotally attached to the bottom panel. The rear panel of the basket includes a pair of leg holes for receiving the legs of a small child sitting in the basket. A lifting bar is adapted to move the child seat to a first position in juxtaposition to the bottom panel when the seat back panel is moved to a seat back position substantially perpendicular to the bottom panel and to move the child seat to a second position covering the leg openings when the seat back panel is moved to a seat back position in juxtaposition to the bottom panel.

8 Claims, 14 Drawing Figures

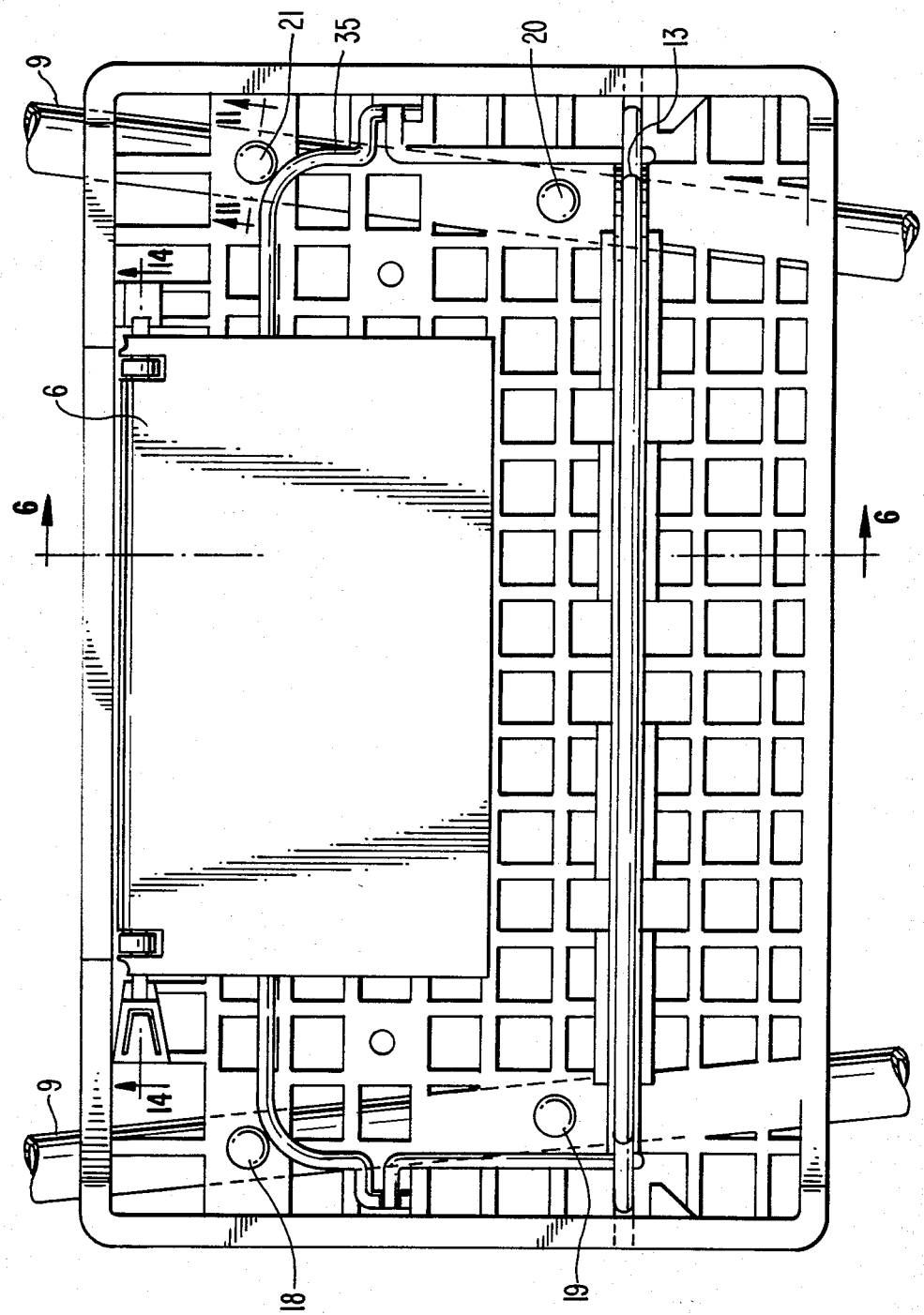

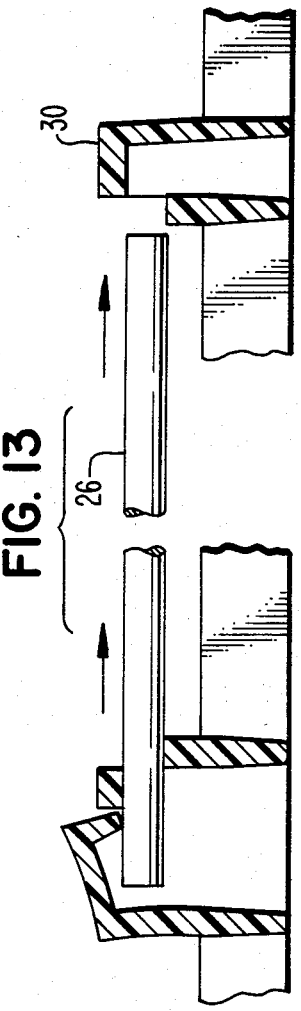
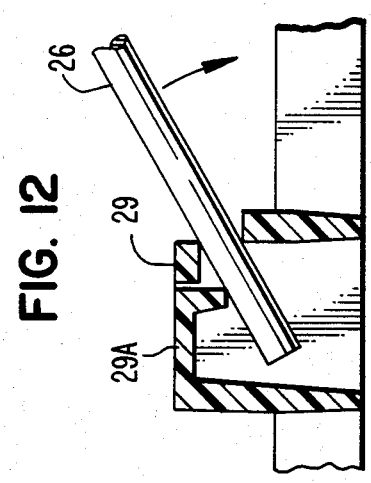
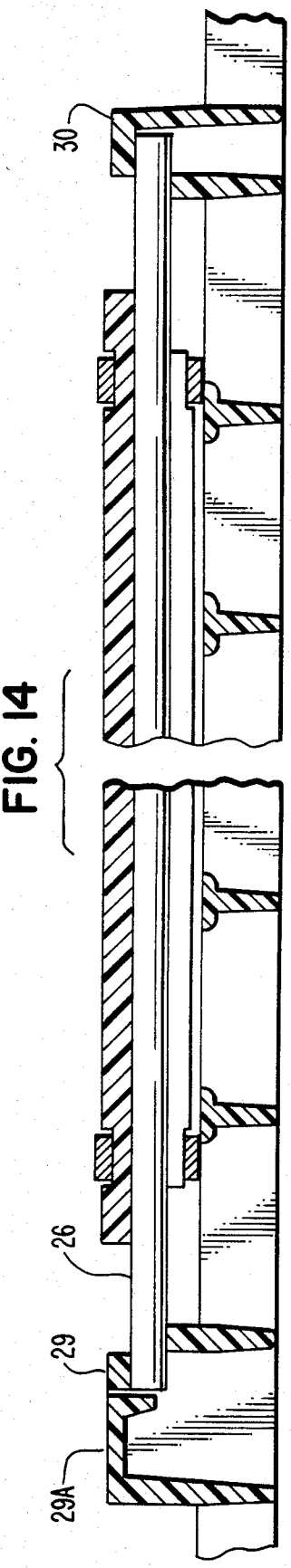

PLASTIC BASKET FOR USE WITH A CART HAVING FRONT AND REAR BASKETS

BACKGROUND OF THE INVENTION

This invention relates generally to the field of carts used in supermarkets and the like, and is directed particularly to a novel basket for use as the rear basket in an over-the-counter shopping cart having front and rear baskets.

Many over-the-counter (OTC) shopping carts known in the prior art have both a front and a rear basket. The front basket is provided for holding groceries or other items while the rear basket is adapted to carry a small child.

In many OTC carts known in the prior art, the front and rear baskets are entirely of open wirework construction. Wirework construction, however, produces a basket that is unsatisfactory. Baskets constructed in this manner are inherently deficient, both in terms of difficulty of manufacture and in terms of maintenance and up-keep. The wires in the basket are welded at the crossing points and the basket is chrome-plated to provide a smooth, cleanable and attractive surface. The welding and plating processes are intricate and complex with the results often being less than desired. In time, the wire welds and plating frequently break due to inadvertent impacts during routine use. The plating is also subject to removal during normal wear and by scraping against other objects. When the plating is removed or scraped away or broken, the base metal is exposed and can easily corrode. When corrosion occurs, the cart, and particularly the baskets, become unsightly and unattractive. Moreover, articles placed in baskets in such deteriorated conditions can become pinched or snared by the unsecured or broken wires, thereby resulting in inconvenience to the cart user and damage to the goods carried in the baskets.

Repair and maintenance is another area where baskets of open wirework construction are deficient. Not only is it difficult to bend deformed wires back into shape, it is difficult and expensive to reweld and replate them. The cart frame and baskets are often integral with one another in OTC carts known in the prior art and, therefore, they cannot easily be taken apart to repair or replace damaged components. Frequently, carts having baskets of wirework construction are not repaired but are discarded when they become too unsightly for use.

OTC carts known in the prior art having baskets made of open wirework construction are also quite heavy and are difficult to push and to maneuver, especially if the cart wheels are not in good working order.

The problems associated with baskets of wirework construction are particularly serious with respect to the rear basket. As mentioned above, the rear basket is often provided for carrying small children. It goes without saying that loose and unsecured wires in the rear basket create a substantial safety hazard to children who are seated in such baskets.

Many of the above-mentioned problems with respect to baskets of wirework construction were pointed out and addressed in my U.S. Pat. No. 3,999,774, directed to a non-OTC cart with a stationary plastic basket and my U.S. Pat. No. 4,273,346, directed to an OTC cart having a plastic front basket and a wire rear basket. The material disclosed in these patents are incorporated herein by reference.

While the baskets and carts disclosed in my previous patents overcame many of the problems and disadvantages associated with carts known in the prior art, these carts remain deficient in the area of the rear basket.

SUMMARY OF THE INVENTION

It is the overall object of the present invention to provide a new and improved basket for use as the rear basket in an over-the-counter cart which overcomes many of disadvantages of baskets known in the prior art.

A specific object of the present invention is to provide a new and improved basket for use as the rear basket in an over-the-counter cart which is lighter in weight than baskets known in the prior art.

Another specific object of the present invention is to provide a new and improved basket for use as the rear basket in an over-the-counter cart which is not as easily damaged by impacts as baskets known in the prior art.

A still further specific object of the present invention is to provide a new and improved basket for use in an over-the-counter cart which is easier to manufacture, to clean and to maintain than baskets known in the prior art.

Another specific object of the present invention is to provide a new and improved basket for use in an over-the-counter cart which creates less noise during use than baskets known in the prior art.

A still further object of the present invention is to provide a new and improved basket for use as the rear basket in an over-the-counter cart which is easier to replace than baskets known in the prior art.

A further object of the present invention is to provide a new and improved basket for use as the rear basket in an over-the-counter cart which is more attractive than baskets known in the prior art and which maintains it attractiveness over a longer period of time.

A still further specific object of the present invention is to provide a new and improved basket as the rear basket in an over-the-counter cart which is safer for carrying children than baskets known in the prior art.

This invention comprises a basket for use as the rear basket in an over-the-counter cart. The basket may be used for carrying a small child or may be adapted for carrying items such as groceries and the like.

It is contemplated that the basket will be constructed of a plastic material such as polyethylene, which is strong, lightweight and can deform to absorb impacts and return to its original shape without deleterious effect. The sides, front and bottom panels of the basket are integrally molded in one piece. Thus, there are no seams to break, or cracks and crevices to collect dirt. A basket made of plastic also does not rust or corrode. In addition, the use of plastic construction for the rear basket in an over-the-counter cart has been found to reduce the weight of the basket, and the cart itself, by as much as four pounds. The lighter weight of the basket makes it easier to push and to maneuver the cart. Moreover, plastic construction is especially ideal in a rear basket that is used to carry a small child. For there are no wires or other sharp objects which can work loose or break and pose a safety hazard.

The basket of this invention is almost entirely of open lattice work construction, which further lightens its weight, and which permits the contents of the basket to be viewed from any angle. Strength and rigidity is provided to the basket by the use of suitable integral strengthening and tapering ribs.

A key feature of the basket of this invention is that it is adapted to carry a child or may be used to carry any other items. The basket includes a plastic seat back panel pivotally attached to the side panels of the basket and a plastic child's seat pivotally attached to the bottom panel of the basket. The rear panel of the basket also includes a pair of leg openings to accommodate the legs of the child. When the seat back panel is raised to a vertical position, the child's seat automatically falls into place to accommodate the child. When it is desired to use the basket for carrying other items, the seat back panel is lowered in juxtaposition to the bottom panel of the basket which causes the child's seat to automatically raise to a vertical position covering the leg openings in the rear panel of the basket.

BRIEF DESCRIPTION OF THE DRAWINGS

FIG. 4 is a top plan view of the basket with the child seat down and the seat back panel raised for carrying a child in accordance with this invention.

FIGS. 12-14 illustrate installation of the transverse rod which hinges the child seat to the bottom of the basket in accordance with the present invention.

DETAILED DESCRIPTION OF THE PREFERRED EMBODIMENT

Figure 2:
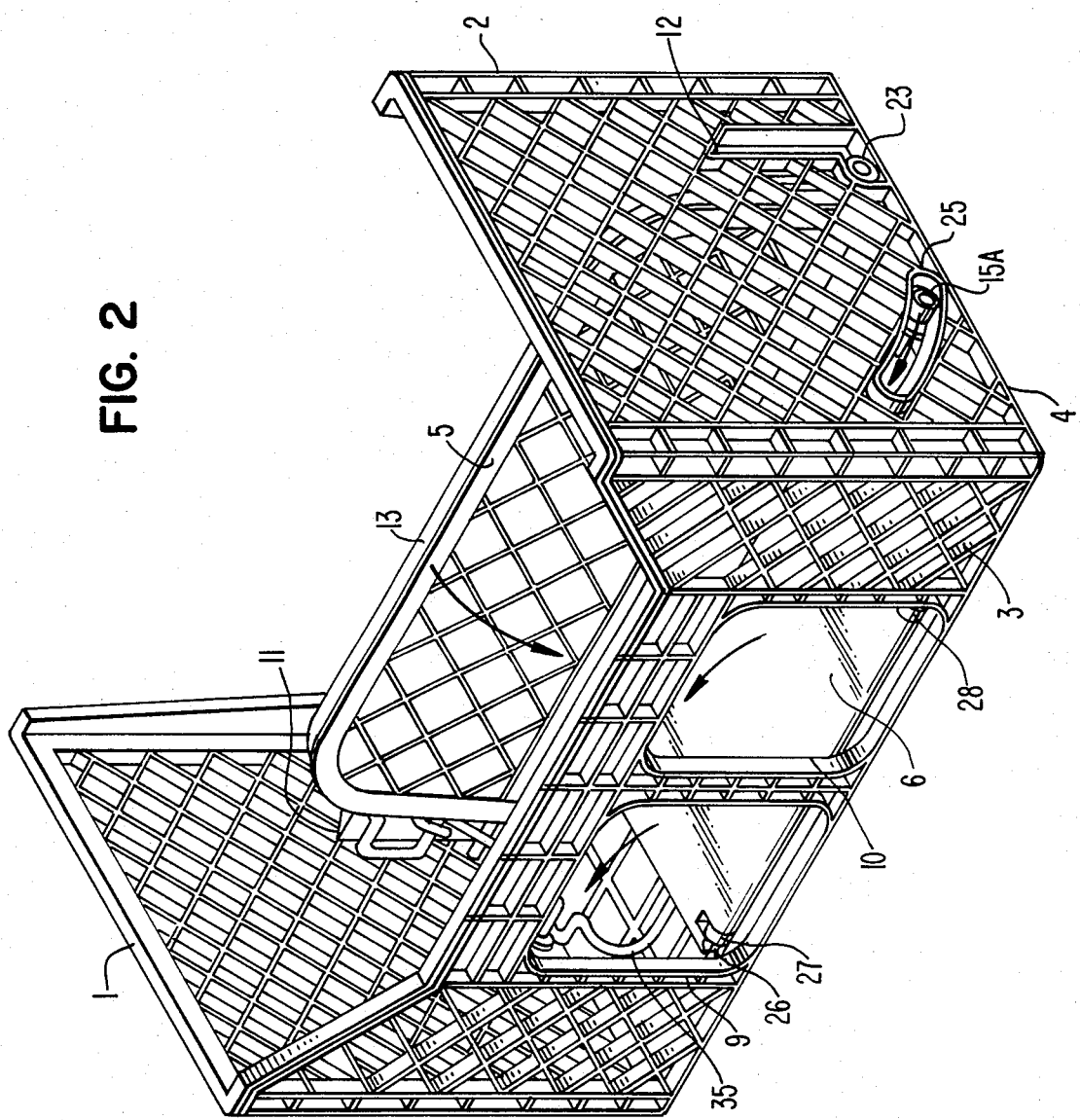
FIG. 2 is a perspective view of the basket in accordance with this invention.

The basket which is the subject of this invention consists of a number of interrelated elements, all of which are shown in at least some detail in FIG. 2 of the drawings. Each component will be explained in detail below in connection with the various figures. As shown in FIG. 2, the basket of the present invention consists basically of side panels 1 and 2, rear panel 3, bottom panel 4, seat back panel 5 and child seat 6.

Figure 1:
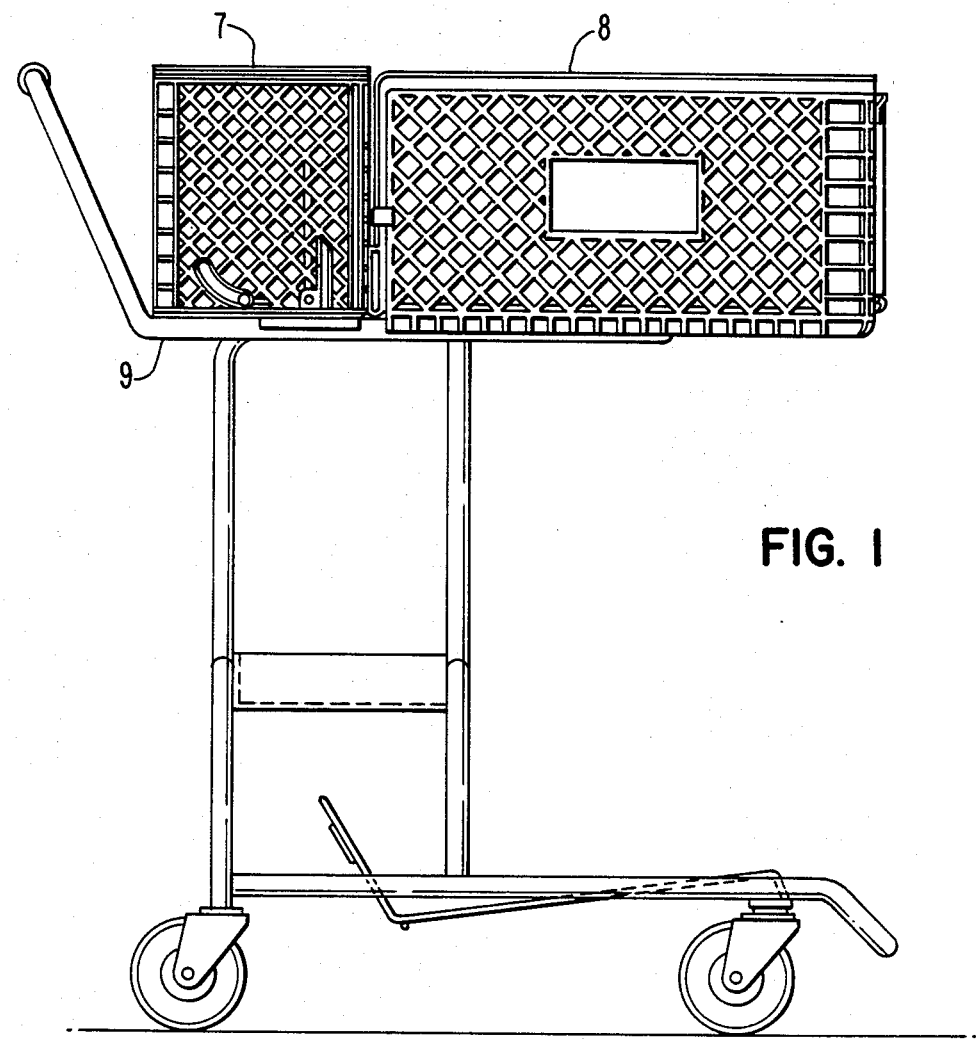
FIG. 1 is a side elevational view of an over-the-counter cart with a rear basket in accordance with this invention.
Figure 11:
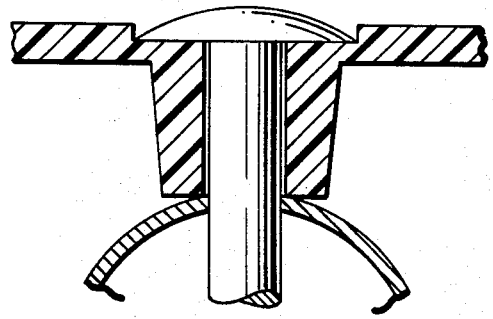
FIG. 11 is a sectional view of the bottom panel of the basket showing a mounting bolt in engagement with the cart frame in accordance with this invention.

With reference to FIG. 1, the basket of this invention, which is generally indicated by reference numeral 7, may be used as the rear basket in an over-the-counter cart having front and rear baskets. Basket 7 is positioned behind front basket 8 and may be secured to horizontal frame 9 of the cart chassis by bolts or other fastening means such as rivets. In the preferred embodiment of the present invention, basket 7 is secured to frame 9 by rivets through holes 18-21 in bottom panel 4 as shown in FIGS. 4 and 11.

Basket 7 may be manufactured of a plastic material such as polyethylene, although other materials may be used which have similar properties. Polyethylene, however, is ideally suited to this application because it is relatively strong while being flexible enough to absorb some deformation, such as caused by impacting, without breaking. In order to facilitate cleaning of the basket, and to allow the user to observe the goods placed in the basket, basket 7 is constructed of open lattice work. The lattice can be any one of a multitude of patterns. As shown herein, the side and rear panel pattern is essentially diamond shaped while the bottom panel pattern is square or rectangular. It is also contemplated that solid portions may be added at various points to provide strength and support to the basket.

As shown in FIG. 2, basket 7 comprises side panels 1 and 2, rear panel 3 and bottom panel 4. These panels are injection molded, integrally with one another, in a single unit. Seat back panel 5 may also be injection molded of polyethylene plastic with an open lattice work construction as shown while child seat 6 may be molded as a solid panel for a carrying a logo or advertisement. Seat back panel 5 and child seat 6 may also be molded simultaneously with the side, bottom and rear panels of basket 7.

Figure 5:
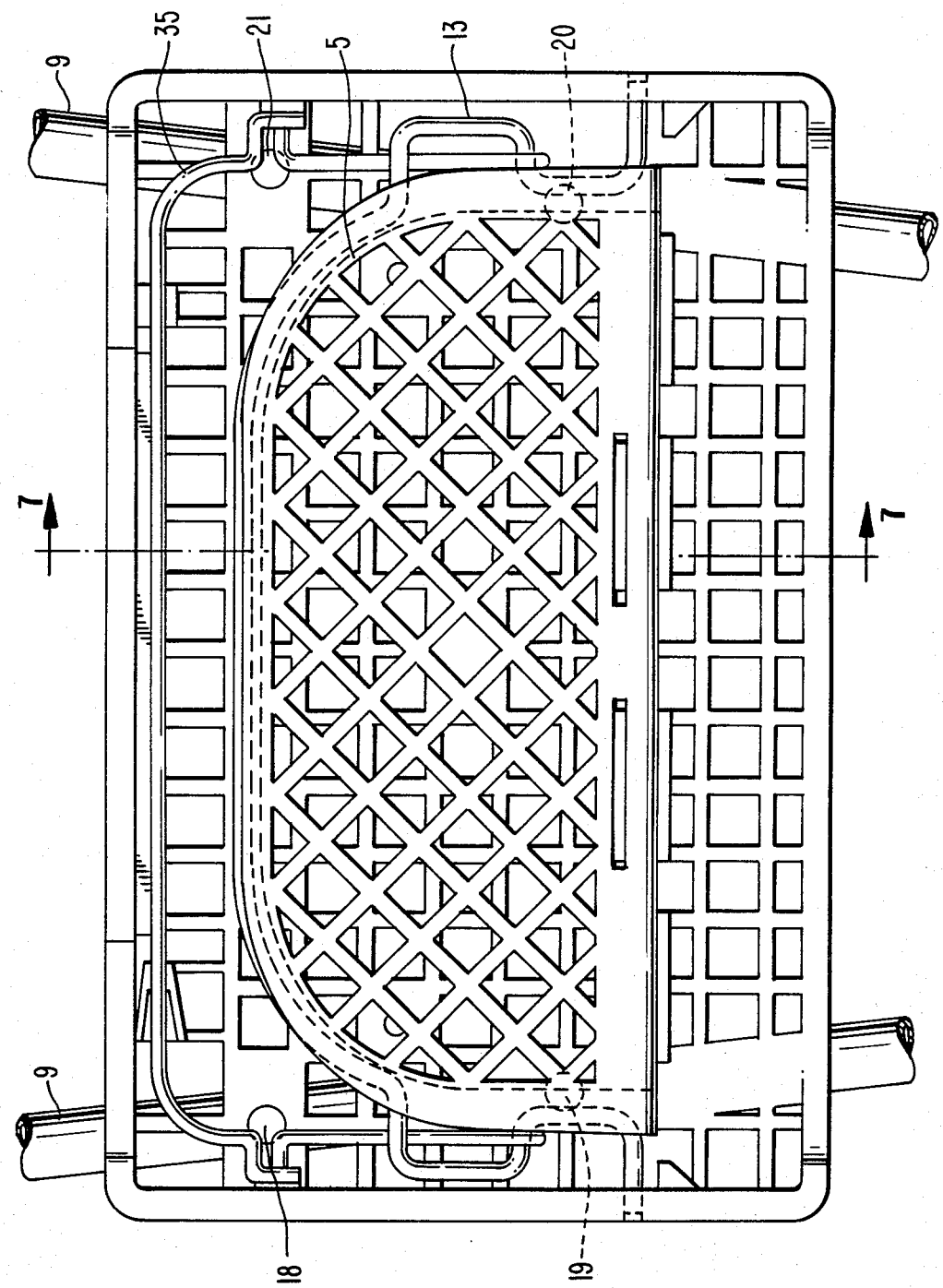
FIG. 5 is a top plan view of the basket with the child seat up and the seat back panel down for carrying additional items in accordance with this invention.
Figure 7:
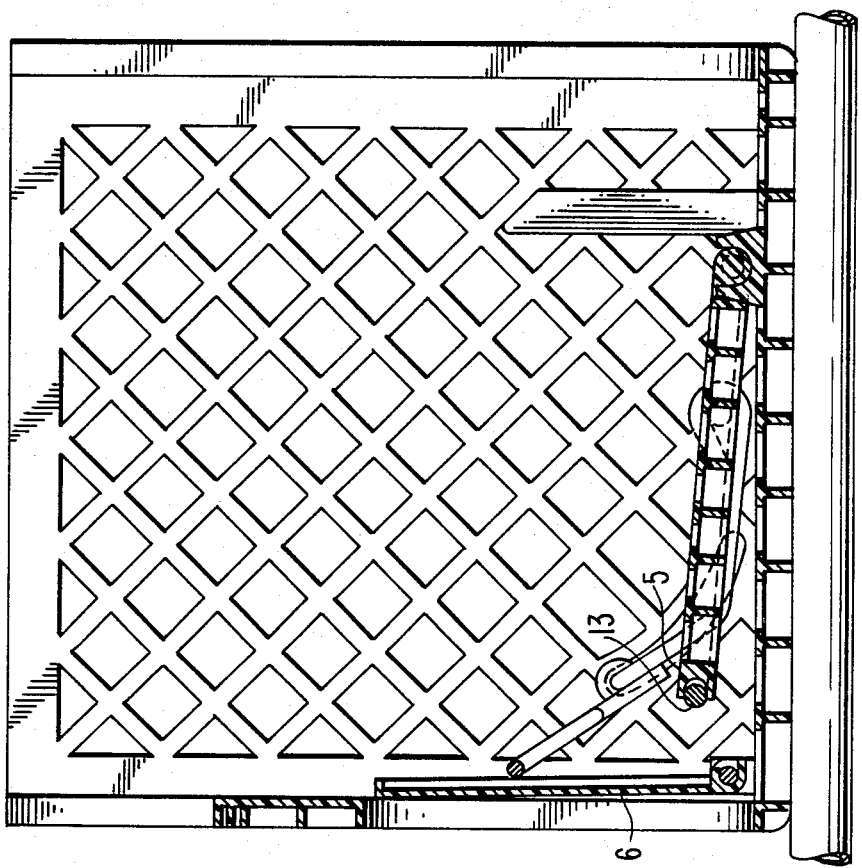
FIG. 7 is a sectional view taken along line 7—7 of FIG. 5.
Figure 6:
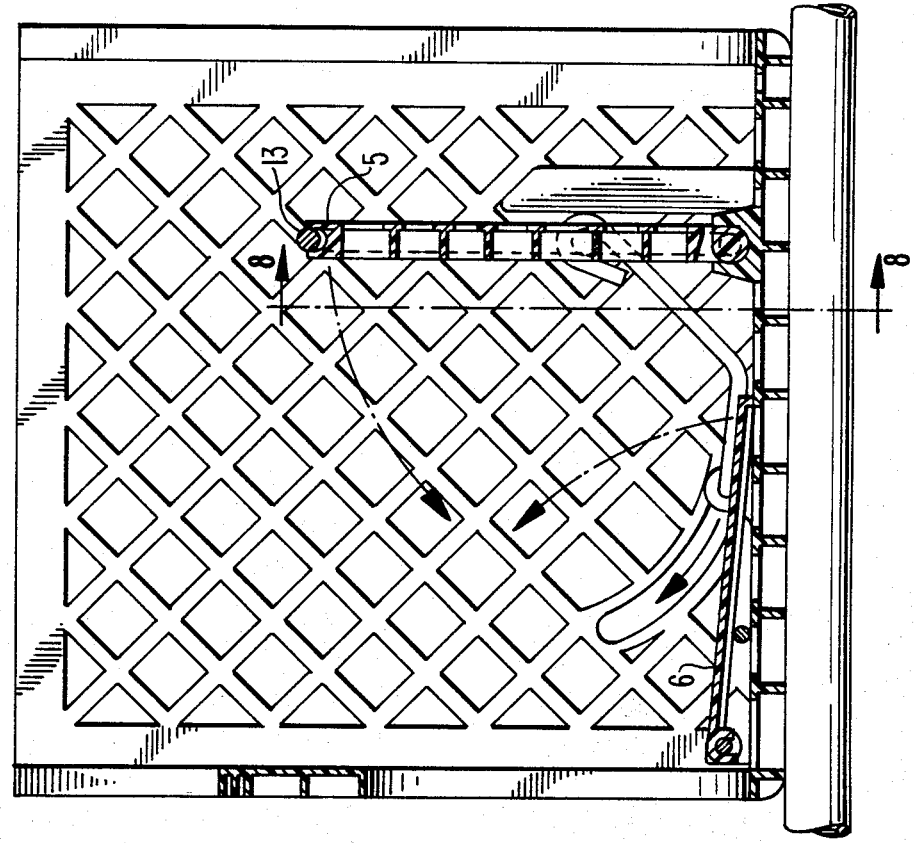
FIG. 6 is a sectional view taken along line 6—6 of FIG. 4.
Figure 8:
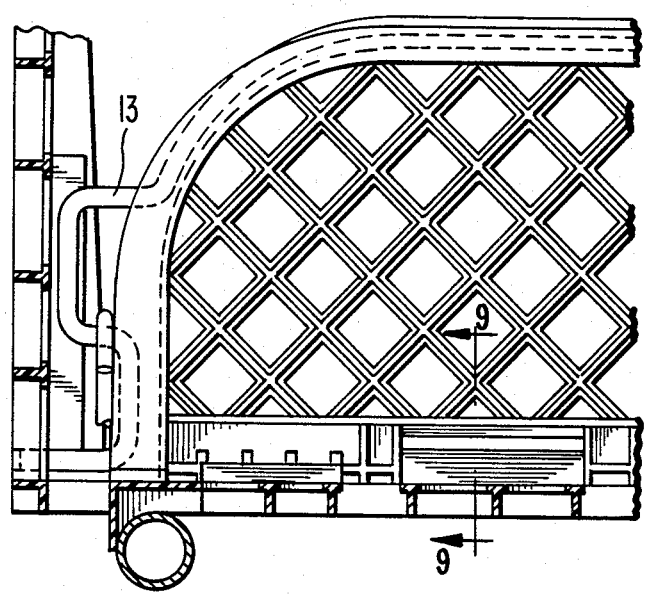
FIG. 8 is a sectional view of the seat back panel showing the reinforcing bar and hinging means of the seat back panel in accordance with this invention.
Figure 9:
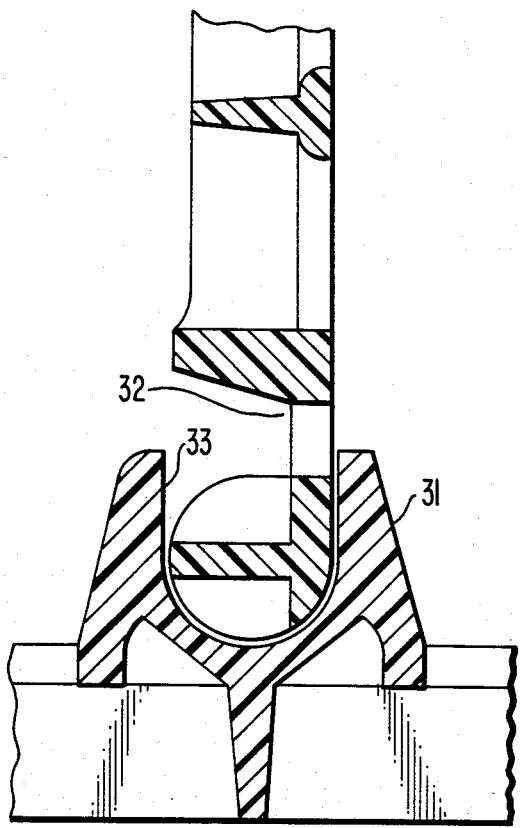
FIG. 9 is a sectional view of the seat back panel in engagement with the bottom panel when the seat panel is in an upright position in accordance with this invention.

Seat back panel 5 is pivotally attached to side panels 1 and 2 and child seat 6 is pivotally attached to bottom panel 4. When it is desired that basket 7 be adapted to carry a child, seat back panel 5 is raised to a vertical position substantially perpendicular to bottom panel 4 as shown in FIGS. 2 and 4. Child seat 6 is then permitted to lay in juxtaposition to bottom panel 4 permitting a small child to sit in basket 7 with his legs extending through leg opening 9 and 10 which are formed in rear panel 3. When it is desired that basket 7 be used for carrying other items, seat back panel 7 may be lowered in juxtaposition to bottom panel 4 as shown in FIG. 5. When this occurs, child seat 6 is automatically raised to cover leg openings 9 and 10 as will be explained below in connection with FIG. 3. Also shown in FIG. 2 are seat back panel stops 11 and 12 which serve as rear stops for seat back panel 5. Panel stops 11 and 12 may be molded integrally with side panels 1 and 2 as shown.

Figure 3:
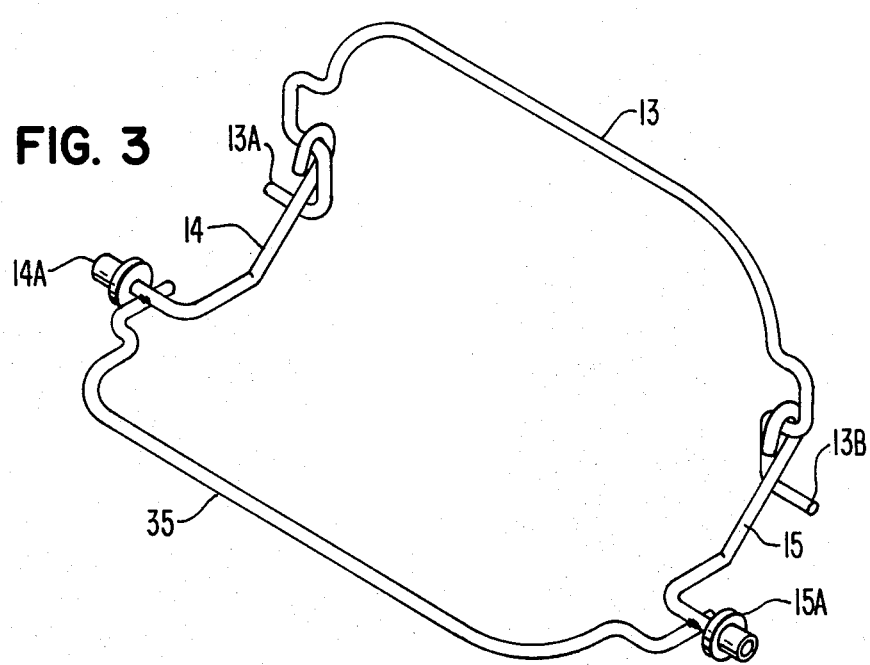
FIG. 3 is a perspective view of the seat back panel reinforcing rod and child seat lifting rod in accordance with this invention.

With reference to FIG. 3, there is shown a lifting bar assembly for seat back panel 5 and child seat 6. The assembly comprises reinforcing rod 13 with hinge pins 13A and 13B, connecting rods 14 and 15 with cam followers 14A and 15A, respectively, and lifting rod 35. Seat back panel 5 comprises an outer periphery along two sides and the top edge which have a pair of spaced parallel shoulders defining a channel for receiving reinforcing rod 13 as shown in FIGS. 2 and 5. Reinforcing rod 13 substantially reinforces seat back panel 5 and also serves as a hinging member for the seat back panel via hinge pins 13A and 13B. Side panels 1 and 2 have integrally molded holes 22 and 23 which comprise hinge means which hingedly receive hinge pins 13A and 13B, respectively. Thus, seat back panel 5 is permitted to pivot about hinge pins 13A and 13B between a first seat back position substantially perpendicular to bottom panel 3 and a second seat back position in juxtaposition to bottom panel 3. Reinforcing rod 13, and associated hinge pins 13A and 13B, may be fabricated from a variety of materials having high strength, including many metals.

As shown in FIG. 2, the base of child seat 5 is pivotally attached to bottom panel 4 near the rear portion of the basket via transverse rod 26. In the preferred embodiment of the invention, transverse rod 26 is attached to child seat 6 by clips 27 and 28 as shown in FIG. 2, at the bottom outward extremities of child seat 6. With reference to FIGS. 12–14, the top rear portion of bottom panel 3 includes rod holder 29 with flexible member 29A and rod holder 30 as shown in FIGS. 12–14. After attachment to child seat 5 with clips 27 and 28, transverse rod 26 is installed in rod holders 29 and 30. Thus, rod holders 29 and 30 form a hinging means which hingedly receives transverse rod 26. Thus, child seat 5 is permitted to move between a first position in juxtaposition to bottom panel 3 and a second position covering leg openings 9 and 10 in rear panel 3.

Lifting rod 35 is provided for automatically raising and lowering child seat 6 in relation to the position of seat back panel 5. This is accomplished through the operation of cam followers 14A and 15A coupled to reinforcing rod 13 via connecting rods 14 and 15, respectively. Cam followers 14A and 15A are in camming engagement with camming slots 24 and 25 which are formed in side panels 1 and 2, respectively. Cam followers 14A and 15A comprise plastic bushings, rigidly secured to reinforcing rod 13, which ride inside camming slots 24 and 25, respectively. Lifting rod 35 is substantially U-shaped, as shown, and is positioned beneath child seat 6 as shown in FIGS. 2 and 4. Thus, while seat back panel 5 is in a vertical position as shown in FIG. 2, lifting rod 35 permits child seat 6 to remain in a first position in juxtaposition to bottom panel 4. However, when seat back panel 5 is moved to a position in juxtaposition to bottom panel 4, connection rod 14 and 15 cause followers 14A and 15A, respectively, to travel along camming slots 24 and 25, respectively. Accordingly, lifting rod 35 raises child seat 6 to a second position covering leg openings 9 and 10 in rear panel 3. When seat back panel 5 is returned to a vertical position, lifting rod 35, via camming slots 24 and 25 and associated cam followers 14A and 15A, returns to a position adjacent bottom panel 3 and child seat 6 is, therefore, permitted to be lowered to a position in juxtaposition to bottom panel 3. The use of plastic bushings as cam followers permit a plastic-to-plastic interface between the camming slots and the cam followers thus preventing excessive wear and deterioration of the camming slot. The plastic bushings may also be injected molded at the same time as the other parts of the basket, including several extra ones for subsequent replacement purposes. Camming slots 24 and 25 are also formed in an upward direction as shown in FIG. 2. It was found that forming the camming slots in this manner provides for a much smoother operation of lifting rod 35.

Figure 10:
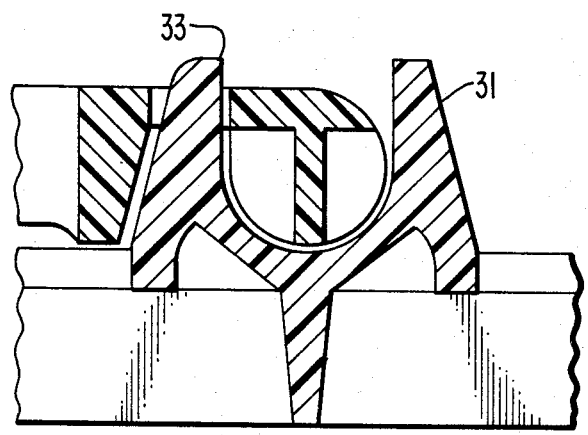
FIG. 10 is a sectional view of the seat back panel in engagement with the bottom panel when the seat back panel is in a downward position in accordance with this invention.

As shown in FIGS. 6, 7, 9 and 10, seat back panel 5 is supported on bottom panel 3 in a plurality of cradles 31. As shown, the bottom portion of seat back 5 has a radius to permit its rotation in cradles 31. Seat back 5 also includes windows 32 which receives rear side wall 33 of cradles 31 as shown in FIG. 10. Thus, seat back 5 is permitted to lie in close juxtaposition to bottom panel 3 when the basket is not being used to carry a child. The bottom portion of seat back 5 and cradles 31 also combine with the lifting bar assembly shown in FIG. 3 to form an over-center-locking feature which permits the seat back to be locked in either a vertical or a horizontal position.

Obviously, many modifications and variations of the above described preferred embodiment will become apparent to those skilled in the art from a reading of this disclosure. It should be realized that the invention is not limited to the particular apparatus disclosed, but its scope is intended to be governed only by the scope of the appended claims.

I claim:

1. A plastic rear basket for use with a cart having separate front an rear baskets, said cart having a horizontal frame portion to which the baskets are attached, said plastic basket comprising:

a pair of opposed side panels, a rear panel, and a bottom panel attached together along their contiguous edges, said side panels and said bottom panel terminating in a front edge, said side panels, said rear panel and said bottom panel being integrally molded with one another and said bottom panel comprising integrally molded cradling means adapted for receiving the bottom edge of a seat back panel, said seat back panel being pivotally attached to said side panels and is supported by said bottom panel at the front portion of said rear basket, wherein said seat back panel is movable between a first seat back panel position substantially perpendicular to said bottom panel and a second seat back panel position in juxtaposition to said bottom panel;

a child's seat pivotally attached to said bottom panel at the rear portion of said basket;

said rear panel comprising at least one leg opening for accommodating the legs of a child sitting on said child's seat, said child's seat being movable between a first seat position in juxtaposition to said bottom panel and a second seat position covering said leg opening; and a lifting bar assembly adapted to move said child's seat to said first seat position when said seat back panel is moved to said first seat back panel position and to move said child's seat to said second seat position when said seat back panel is moved to said second seat back panel position, said lifting bar assembly cooperating with said cradling means to provide over-center-action for said seat back panel to lock said seat back panel in its respective said first and second seat back panel positions.

2. The plastic basket of claim 1 wherein at least one of said side panels includes a seat back panel stop for stopping the movement of said seat back panel when said seat back panel is substantially perpendicular to said bottom panel, said seat back panel stops being integrally molded in said side panel.

3. The plastic basket of claim 1 wherein said seat back panel comprises an outer periphery having a pair of integrally molded spaced parallel shoulders extending along said periphery to define a channel for receiving a reinforcing means for reinforcing said seat back panel.

4. The plastic basket of claim 3 wherein at least one of said side panels includes hinge means integrally molded in said side panel, said reinforcing means including a corresponding hinge member portion which hingedly engaging said hinge means.

5. The plastic basket of claim 1 wherein said bottom panel comprises integrally molded hinge means and said child's seat comprises a corresponding hinge member which hingedly engages said hinge means for moving said child's seat between a first position in juxtaposition to said bottom panel and a second position covering said leg opening.

6. A plastic rear basket for use with a cart having separate front and rear baskets, said cart having a horizontal frame portion to which the baskets are attached, said plastic basket comprising:

a pair of opposed side panels, a rear panel, and a bottom panel attached together along their contiguous edges, said side panels and said bottom panel terminating in a front edge;

a seat back panel pivotally attached to said side panels and supported by said bottom panel at the front portion of said rear basket; p1 a child's seat pivotally attached to said bottom panel at the rear portion of said basket;

said rear panel comprising at least one leg opening for accommodating the legs of a child sitting on said child's seat, said child's seat adapted to be movable between a first position in juxtaposition to said bottom panel and a second position covering said leg opening;

said seat back panel being movable between a first seat back position substantially perpendicular to said bottom panel and a second seat back position in juxtaposition to said bottom panel; and a lifting bar adapted to move said child's seat to said first position in juxtaposition to said bottom panel when said seat back panel is moved to said seat back position substantially perpendicular to said bottom panel and to move said child's seat to said second position covering said leg opening when said seat back panel is moved to said seat back position in juxtaposition to said bottom panel, wherein said side panels include at least one camming slot and said lifting bar being coupled to at least one cam follower received in said camming slot, said lifting bar being adapted to move said child's seat to said first position in juxtaposition to said bottom panel when said seat back panel is moved to said seat back position substantially perpendicular to said bottom panel and to move said child's seat to said second position covering said leg opening when said seat back panel is moved to said seat back position in juxtaposition to said bottom panel.

7. The plastic basket of claim 6 wherein said cam follower comprises a plastic bushing in sliding contact with said camming slot and said camming slot is directed in an upwardly curving direction toward said rear panel with respect to said bottom panel.

8. A plastic rear basket for use with a cart having separate front and rear baskets, said cart having a horizontal frame portion to which the baskets are attached, said plastic basket comprising:

a pair of opposed side panels, a rear panel, and a bottom panel attached together along their contiguous edges, said side panels and said bottom panel terminating in a front edge;

a seat back panel pivotally attached to said side panels and supported by said bottom panel at the front portion of said rear basket;

a child's seat pivotally attached to said bottom panel at the rear portion of said basket;

said rear panel comprising at least one leg opening for accommodating the legs of a child sitting on said child's seat, said child's seat adapted to be movable between a first position in juxtaposition to said bottom panel and a second position covering said leg opening;

said seat back panel being movable between a first seat back position substantially perpendicular to said bottom panel and a second seat back position in juxtaposition to said bottom panel; and a lifting bar adapted to move said child's seat to said first position in juxtaposition to said bottom panel when said seat back panel is moved to said seat back position substantially perpendicular to said bottom panel and to move said child's seat to said second position covering said leg opening when said seat back panel is moved to said seat back position in juxtaposition to said bottom panel, wherein said bottom panel comprises hinge means integral to said bottom panel and said child's seat comprises a hinge member for hingedly engaging said hinge means for moving said child's seat between said first position in juxtaposition to said bottom panel and said second position covering said leg opening and wherein said hinging means integral to said bottom panel comprises recessed sections including a flexible member which can be elevated for receiving said hinge member.

* * * * *